Nov. 30, 1937.　　　S. COVALT　　　2,100,471
CREAM DIPPER
Filed Dec. 28, 1936
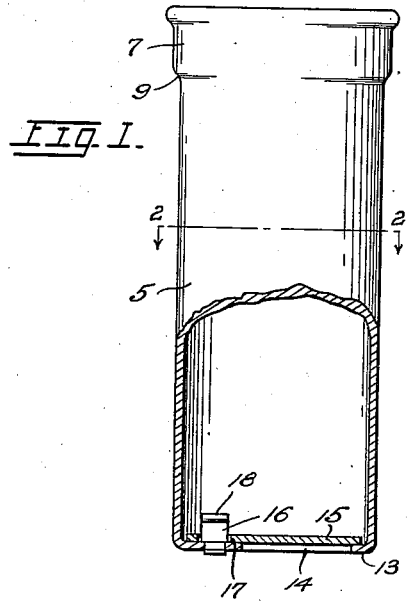
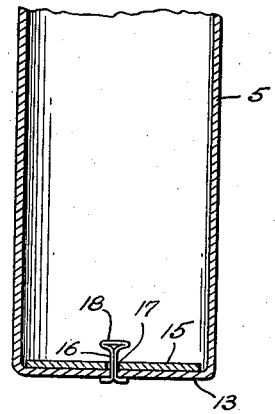
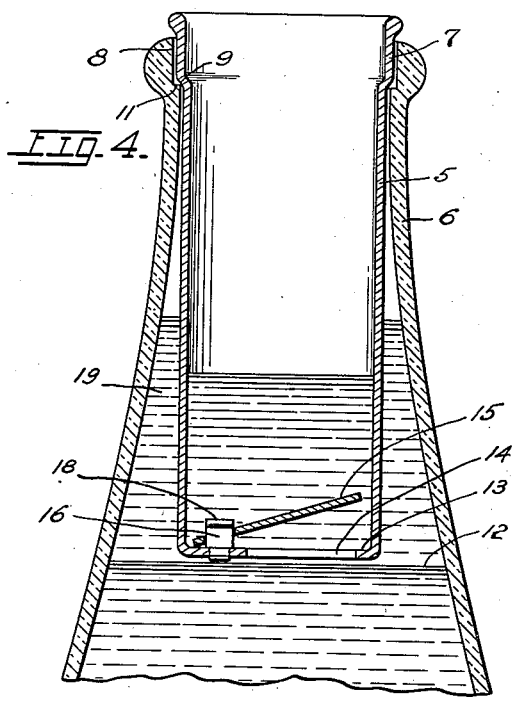
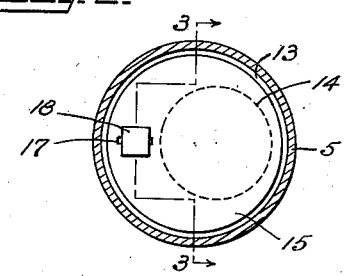
Inventor;
Scott Covalt,
per Arthur J. Farnsworth.
Attorney.

Patented Nov. 30, 1937

2,100,471

UNITED STATES PATENT OFFICE 2,100,471

CREAM DIPPER

Scott Covalt, Van Nuys, Calif.

Application December 28, 1936, Serial No. 117,846

2 Claims. (Cl. 210—51.5)

My invention relates to cream dippers, and among its objects are; to provide an improved device for separately extracting cream from milk bottles, and for similar purposes; the device being very simple, inexpensive, effective, and adapted for being kept in a sanitary condition. These objects have been attained in the manner illustrated in the accompanying drawing, in which—

Figure 1 is a side elevation of the device, shown with certain portions broken away to disclose internal features;

Figure 2 is a plan view of a section of the device taken on the plane 2—2 of Fig. 1;

Figure 3 is an elevation of the lower portion of the device, in section taken on the stepped vertical planes indicated by line 3—3 of Fig. 2; and Figure 4 is an axial sectional elevation of the upper portion of a milk bottle; and of my device in operative position therein.

Similar reference numerals refer to similar parts throughout the several views.

The form of my invention which has been selected for illustration, comprises a tubular body 5, having a diameter adapting it for being inserted with small clearance into the neck 6 of a standard size milk bottle. The upper end of the body is expanded as shown at 7, to fit mouth 8 of the bottle with small clearance, and to provide a rim 9 adapted to seat upon shoulder 11 at the throat of the bottle. The length of body 5 is such that its lower end can extend to at least just above level 12 of the normal cream line of the bottle contents.

The lower end of body 5 is formed with an internal integral flange 13, constituting a bottom with a relatively large opening 14 therethrough. Immediately above flange 13 is a disk valve 15, adapted to seat upon the upper surface of the flange to close opening 14.

Disk valve 15 is positioned, and its movements are limited, by means of an upstanding member 16. The latter is attached to flange 13, and extends through a correspondingly shaped and properly fitted opening 17 in the disk valve. Member 16 is provided with a T-head 18, and its vertical dimension is such as to permit the disk valve to assume a tilted position, as shown in Fig. 4. This permits cream, from space 19 of the bottle, to flow into the device through opening 14.

When my device has been inserted in a bottle containing gravitationally separated cream and milk, in the manner indicated in Fig. 4, the external hydraulic head will cause valve 15 to open, and cream will flow into the device until the external and internal levels become approximately equal. Valve 15 will then close by gravity, and the device with its cream contents may be lifted out of the bottle. The operation may be repeated until practically all of the cream is withdrawn from the bottle, provided only that the length of body 5 is sufficient to extend to cream line 12.

Rim 9 and shoulder 11 are adapted to cooperate to prevent the device from falling into the milk bottle accidentally. Ordinarily they serve no other purpose; since the character and volume of the bottle contents varies, and the level of cream line 12 will vary correspondingly, and also because of the varying time required for gravitational separation of the cream and milk.

Having thus fully described my invention, I claim:

1. A cream dipper comprising; a tubular body having an integral internal flange at the bottom; a disk valve adapted to seat upon the upper surface of the flange to close the bottom; and an upstanding member attached to the flange and extending through a perforation in the valve; said perforation being fitted to the upstanding member in such manner as to allow the valve to tilt; and the upstanding member being provided with means for preventing the valve from becoming displaced therefrom.

2. A cream dipper comprising; a tubular body having an open top, an inwardly extending flange formed integral with the lower end of the body, said flange defining an opening, a disk-shaped valve member adapted to seat on the flange and close the opening, said valve member having a slot adjacent an edge thereof, an upstanding vertically positioned member attached to the flange and extending through the slot of the valve member, the upper end of the vertically extending member having laterally extending portions to prevent displacement thereof from the slot of the valve member, said valve member being adapted to swing upwardly to permit inflow of liquids through the said opening into the tubular body, and downwardly to close the said opening and prevent escape of liquids from the tubular body.

SCOTT COVALT.